(12) United States Patent
Hikita

(10) Patent No.: US 11,458,773 B2  
(45) Date of Patent: Oct. 4, 2022

(54) TYRE FOR RUNNING ON ROUGH TERRAIN

(71) Applicant: SUMITOMO RUBBER INDUSTRIES, LTD., Kobe (JP)

(72) Inventor: Masahiro Hikita, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 478 days.

(21) Appl. No.: 16/523,129

(22) Filed: Jul. 26, 2019

(65) Prior Publication Data

US 2020/0055348 A1 Feb. 20, 2020

(30) Foreign Application Priority Data

Aug. 17, 2018 (JP) .............................. JP2018-153648

(51) Int. Cl.
- *B60C 11/03* (2006.01)
- *B60C 11/11* (2006.01)
- *B60C 11/13* (2006.01)
- *B60C 11/01* (2006.01)

(52) U.S. Cl.
CPC ........... *B60C 11/0327* (2013.01); *B60C 11/11* (2013.01); *B60C 11/1369* (2013.01); *B60C 11/1376* (2013.01); *B60C 11/01* (2013.01); *B60C 11/1323* (2013.01); *B60C 2011/036* (2013.01); *B60C 2200/10* (2013.01); *B60C 2200/14* (2013.01)

(58) Field of Classification Search
CPC . B60C 2200/14; B60C 11/1369; B60C 11/11; B60C 2200/10; B60C 11/1376; B60C 11/13; B60C 11/033
USPC .................................................. 152/209.11
See application file for complete search history.

(56) References Cited

U.S. PATENT DOCUMENTS

| D579,406 S | 10/2008 | Sueishi | |
| D820,772 S * | 6/2018 | Matsuda | B60C 11/11 |
| | | | D12/536 |
| 2009/0218019 A1 | 9/2009 | Paturle | |
| 2012/0018067 A1* | 1/2012 | Hikita | B60C 11/11 |
| | | | 152/209.8 |

(Continued)

FOREIGN PATENT DOCUMENTS

| EP | 2 965 926 A1 | 1/2016 |
| GB | 324825 A | 2/1930 |

(Continued)

OTHER PUBLICATIONS

Extended European Search Report dated Dec. 19, 2019, for corresponding European Patent Application No. 19188369.3.

*Primary Examiner* — Robert C Dye  
*Assistant Examiner* — Nicholas J Weiler  
(74) *Attorney, Agent, or Firm* — Birch, Stewart, Kolasch & Birch, LLP (57) ABSTRACT

A tyre for running on rough terrain includes a tread portion. The tread portion includes a crown region, middle regions, and shoulder regions. The crown region is provided with a plurality of crown blocks. The middle regions are provided with a plurality of middle blocks. The shoulder regions are provided with a plurality of shoulder blocks. Each of the middle blocks is connected with at least one of the crown blocks by a crown tie bar and connected with at least one of the shoulder blocks by a shoulder tie bar. A land ratio of the shoulder regions is 90% or more and 115% or less of a land ratio of the crown region.

14 Claims, 5 Drawing Sheets

(56) References Cited

U.S. PATENT DOCUMENTS

| | | | |
|---|---|---|---|
| 2012/0024440 A1* | 2/2012 | Ishida | B60C 11/11 |
| | | | 152/209.1 |
| 2012/0305154 A1* | 12/2012 | Hikita | B60C 11/11 |
| | | | 152/209.11 |
| 2014/0318675 A1* | 10/2014 | Chen | B60C 11/033 |
| | | | 152/209.11 |
| 2015/0122383 A1* | 5/2015 | Hikita | B60C 11/1369 |
| | | | 152/209.11 |
| 2016/0016437 A1* | 1/2016 | Ito | B60C 11/11 |
| | | | 152/209.15 |
| 2020/0039299 A1* | 2/2020 | Hinami | B60C 11/11 |

FOREIGN PATENT DOCUMENTS

| | | |
|---|---|---|
| JP | 3021322 B2 | 3/2000 |
| JP | 2009-512584 A | 3/2009 |

\* cited by examiner

TYRE FOR RUNNING ON ROUGH TERRAIN

TECHNICAL FIELD

The present invention relates to a tyre for running on rough terrain.

BACKGROUND ART

Japanese Patent Publication No. 5616924 has disclosed a pneumatic tyre for running on rough terrain which has a tread portion provided with a plurality of blocks. In the pneumatic tyre configured as such, the blocks stick into a soft road such as a sandy road and a muddy road to obtain traction and cornering force by edges of the blocks, therefore, steering stability is improved.

SUMMARY OF THE INVENTION

In recent years, with respect to the pneumatic tyre described above, there has been expectation for improvement of steering stability performance not only on a soft road, but also on a hard road such as an asphalt road surface. Further, in the pneumatic tyres of this kind, it is expected that block chipping is suppressed.

The present invention was made in view of the above, and a primary object thereof is to provide a tyre for running on rough terrain in which the steering stability performance on a soft road and a hard road is improved and the block chipping is suppressed.

In one aspect of the present invention, a tyre for running on rough terrain includes a tread portion, wherein the tread portion includes a crown region, middle regions, and shoulder regions, the crown region has a center portion thereof positioned on a tyre equator and a development width of one third of a tread development width, the middle regions are arranged on both outer sides in a tyre axial direction of the crown region and each have a development width of one sixth of the tread development width, the shoulder regions are arranged on both outer sides in the tyre axial direction of the middle regions and each have a development width of one sixth of the tread development width, the crown region is provided with a plurality of crown blocks, each of the middle regions is provided with a plurality of middle blocks, each of the shoulder regions is provided with a plurality of shoulder blocks, each of the middle blocks is connected with at least one of the crown blocks by a crown tie bar and connected with at least one of the shoulder blocks by a shoulder tie bar, and a land ratio of the shoulder regions is 90% or more and 115% or less of a land ratio of the crown region.

In another aspect of the invention, it is preferred that the shoulder tie bars include first shoulder tie bars, and a pair of first shoulder tie bars extend from one shoulder block to be connected with two different middle blocks.

In another aspect of the invention, it is preferred that the shoulder tie bars include second shoulder tie bars, and a pair of second shoulder tie bars extend from one middle block to be connected with two different shoulder blocks.

In another aspect of the invention, it is preferred that the shoulder tie bars include second shoulder tie bars, a pair of second shoulder tie bars extend from one middle block to be connected with two different shoulder blocks, the tread portion includes first block groups and second block groups arranged alternately in a tyre circumferential direction, each of the first block groups is formed by one shoulder block connected with two middle blocks by two first shoulder tie bars, and each of the second block groups is formed by one middle block connected with two shoulder blocks by two second shoulder tie bars.

In another aspect of the invention, it is preferred that a height of each of the shoulder tie bars and the crown tie bars is 10% or more and 40% or less of a maximum block height of the crown blocks, the middle blocks, and the shoulder blocks.

In another aspect of the invention, it is preferred that a width perpendicular to a longitudinal direction of each of the shoulder tie bars is 50% or more of a length in the tyre axial direction of each of the shoulder blocks.

In another aspect of the invention, it is preferred that at least one of the middle blocks and the shoulder blocks includes a stepped ground contacting surface including a first top surface and a second top surface having a smaller block height than the first top surface.

In another aspect of the invention, it is preferred that a groove is provided between the first top surface and the second top surface, and the groove includes a pair of axial portions extending in the tyre axial direction.

In another aspect of the invention, it is preferred that each of the pair of the axial portions includes a first inclined portion inclined to one side with respect to the tyre axial direction and a second inclined portion inclined to a side opposite to the first inclined portion with respect to the tyre axial direction.

DESCRIPTION OF THE PREFERRED EMBODIMENT

An embodiment of the present invention will now be described in conjunction with accompanying drawings.

Figure 1:
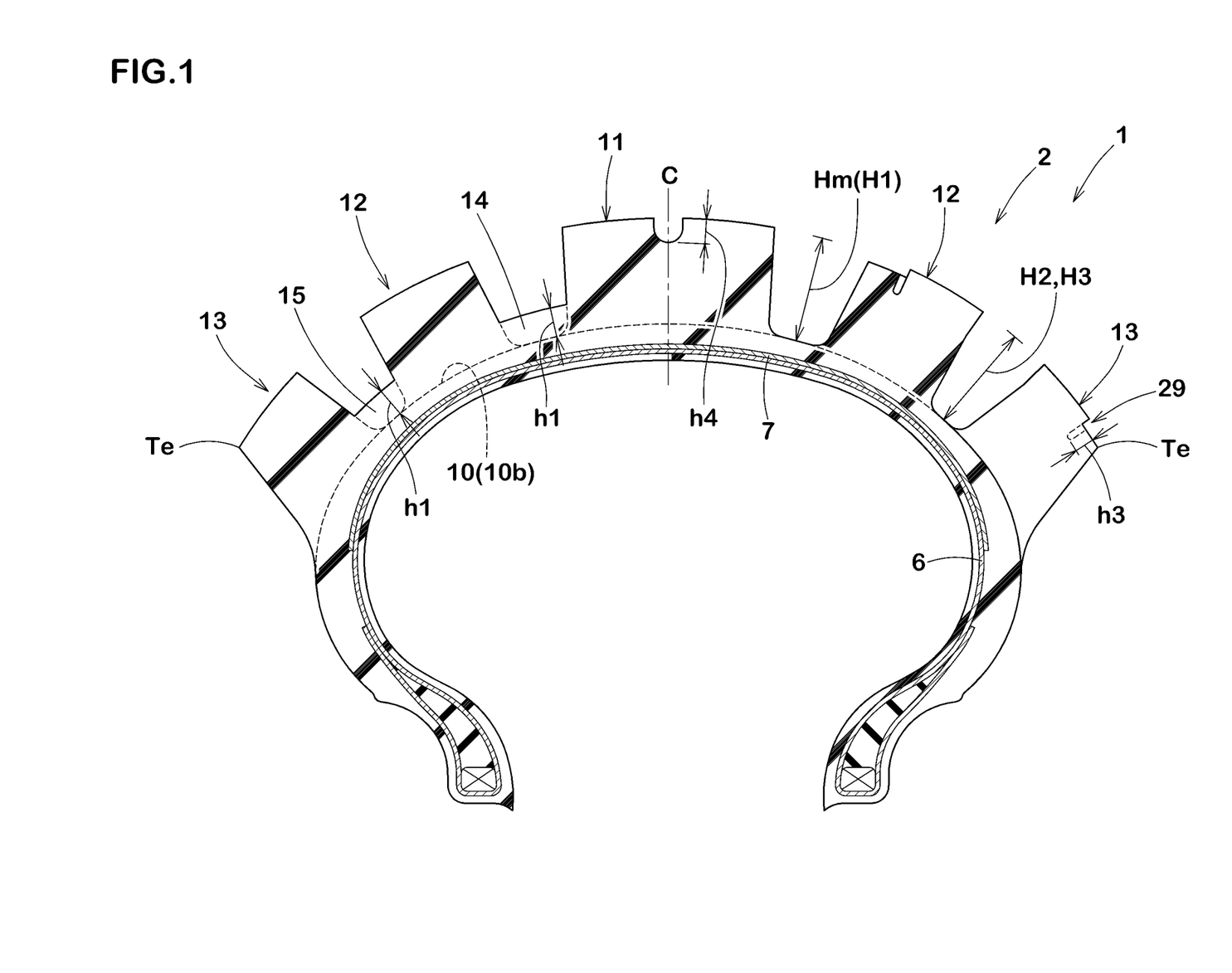
FIG. 1 is a lateral cross-sectional view of a tyre for running on rough terrain according to one embodiment of the present invention.
Figure 2:
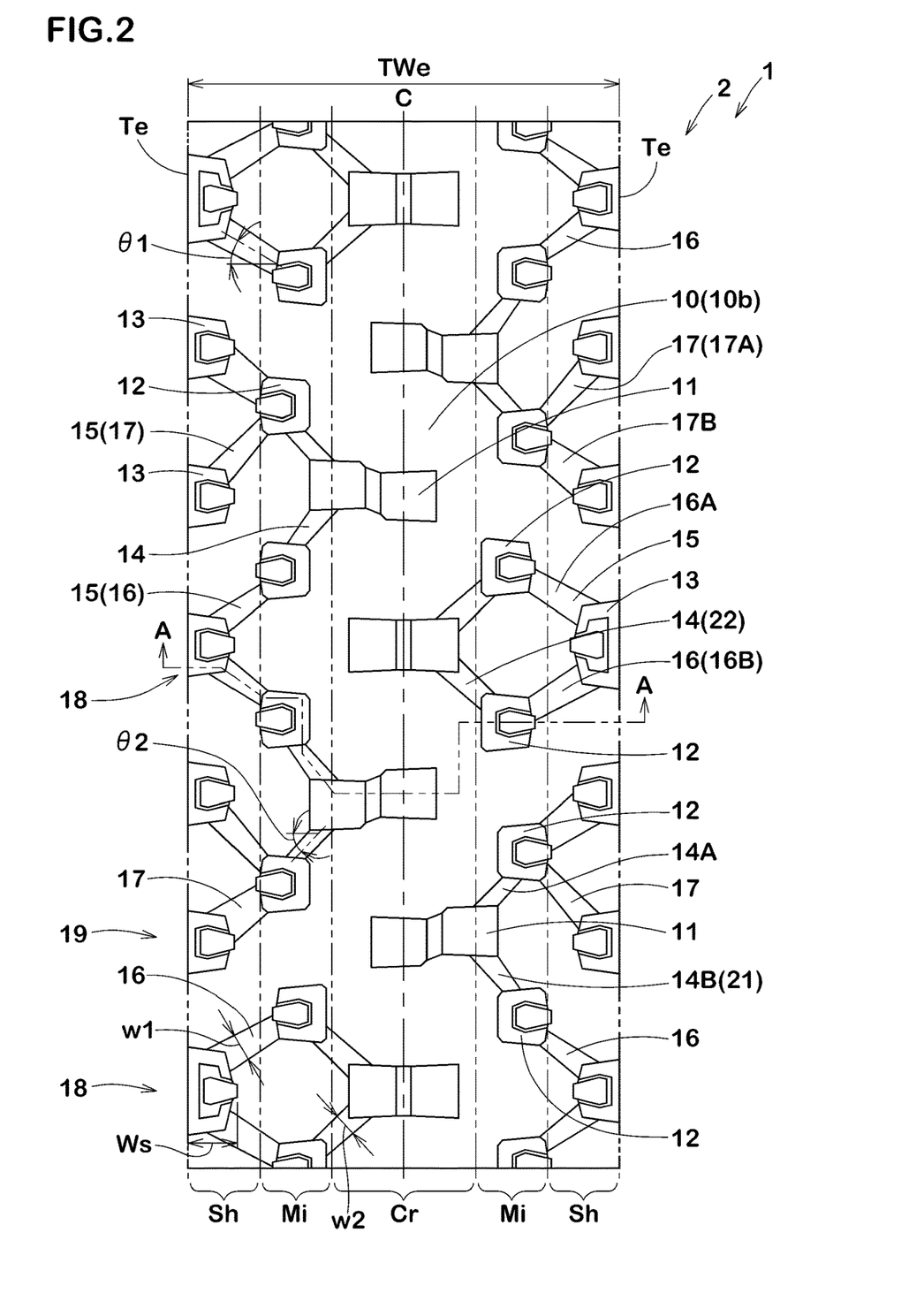
FIG. 2 is a development view showing a tread pattern of a tread portion of FIG. 1.

FIG. 1 is a lateral cross-sectional view of a tyre for running on rough terrain (hereinafter may be simply referred to as "tyre") 1 according to an embodiment of the present invention in a standard state. In this embodiment, a tyre for a motorcycle is shown as a preferred example of the tyre 1. The present invention is not limited to a tyre 1 for a motorcycle, but it is possible that the present invention is also applied to a tyre for a passenger car, a tyre for heavy load, and a tyre in other categories, for example. FIG. 2 is a development view showing a tread pattern of a tread portion 2 of the tyre 1. FIG. 1 is the cross-sectional view taken along A-A line of FIG. 2.

The "standard state" is a state in which the tyre 1 is mounted on a standard rim, inflated to a standard inner pressure, and loaded with no tyre load. In this specification, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, an outer surface of the tread portion 2 of the tyre 1 in this embodiment, in a lateral cross-sectional view thereof, is curved in an arc shape convex outwardly in a tyre radial direction.

A carcass 6 and a belt layer 7 and the like are provided inside the tyre 1 in this embodiment. Known configurations are appropriately used for these.

As shown in FIG. 2, the tread portion 2 is divided so as to include a crown region (Cr), a pair of middle regions (Mi), and a pair of shoulder regions (Sh). The crown region (Cr) has a center thereof on a tyre equator (C) and has a development width of one third of a tread development width (Twe). The middle regions (Mi) are arranged on both outer sides of the crown region (Cr) and each of them has a development width of one sixth of the tread development width (Twe). Each of the shoulder regions (Sh) is arranged on an outer side of a respective one of the middle regions (Mi) and has a development width of one sixth of the tread development width (Twe).

The tread development width (Twe) is a distance in a tyre axial direction between tread edges (Te) when the tread portion 2 is developed into a plane. The tread edges (Te) mean outermost ground contacting positions in the tyre axial direction of the tread portion 2.

The crown region (Cr) is provided with a plurality of crown blocks 11, each of the middle regions (Mi) is provided with a plurality of middle blocks 12, and each of the shoulder regions (Sh) is provided with a plurality of shoulder blocks 13. In each of the crown blocks 11, a centroid of a ground contacting surface thereof is located within the crown region (Cr). In each of the middle blocks 12, the centroid of the ground contacting surface thereof is located within a respective one of the middle regions (Mi). In each of the shoulder blocks 13, the centroid of the ground contacting surface thereof is located within a respective one of the shoulder regions (Sh). Note that in a case where a concave portion such as a groove and the like is provided on the ground contacting surface of each of the blocks 11 to 13, the centroid mentioned above means the centroid of a virtual ground contacting surface obtained by filling the concave portion.

As shown in FIG. 1, each of these blocks 11 to 13 is divided by a tread groove 10. In the tread groove 10 in this embodiment, a groove bottom (10b) thereof is formed by a smooth surface extending along the carcass 6.

Although not particularly limited, it is preferred that a block height (H1) of each of the crown blocks 11, a block height (H2) of each of the middle blocks 12, and a block height (H3) of each of the shoulder blocks 13 are each 6 mm or more and 20 mm or less. Each of the block heights (H1) to (H3) is a height in the tyre radial direction from the groove bottom (10b) of the tread groove 10 to the outermost ground contacting surface in the tyre radial direction.

As shown in FIG. 2, each of the middle blocks 12 in this embodiment is connected with any one of the crown blocks 11 by a crown tie bar 14. Further, each of the middle blocks 12 in this embodiment is connected with any of the shoulder blocks 13 by a shoulder tie bar 15. Thereby, rigidity of the crown blocks 11, the middle blocks 12, and the shoulder blocks 13 is increased, therefore, deformation of each of the blocks 11 to 13 during running is suppressed, thereby, the block chipping is suppressed. Furthermore, with the tyre 1 configured as such, shearing force with respect to a soft road is increased. therefore, excellent steering stability performance on a soft road is exerted. Still furthermore, with the blocks 11 to 13 each having the increased rigidity, it is possible that ground contact pressure on a hard road is increased, therefore, the steering stability performance is improved.

Each of the crown tie bars 14 and the shoulder tie bars 15 in this embodiment is formed as a raised portion in which a part of the groove bottom (10b) of the tread groove 10 is raised.

A land ratio (Ls) of the shoulder regions (Sh) is set to be 90% or more and 115% or less of a land ratio (Lc) of the crown region (Cr). In the tyre 1 configured as such, rigidity difference is made small in the crown blocks 11 to which large ground contact pressure is applied and the shoulder blocks 13 to which large lateral force is applied. Thereby, during straightaway driving and during cornering, stable running is made possible, therefore, the steering stability performance on a soft road and a hard road is improved.

In order to effectively exert the effects described above, it is preferred that a land ratio (Lm) of the middle regions (Mi) is set to be 95% or more and 105% or less of the land ratio (Lc) of the crown region (Cr). Thereby, the rigidity difference of the crown blocks 11 or the shoulder blocks 13 is made small, therefore, sudden change of the behavior is suppressed from straightaway driving to cornering in which a camber angle becomes large, thereby, the steering stability performance is further improved. Each of the land ratios in this specification is a ratio (sb/sa) of a total area (sb) of the ground contacting surface of the blocks 11, 12, or 13 of the respective region (Cr), (Mi), or (sh) with respect to an area (Sa) of a virtual ground contacting surface of the respective region (Cr), (Mi), or (sh) obtained by filling the tread groove 10.

The shoulder tie bars 15 in this embodiment include first shoulder tie bars 16 and second shoulder ti e bars 17. In this embodiment, two first shoulder tie bars 16 extend from one shoulder block 13 to be connected with two different middle blocks 12. In this embodiment, two second shoulder tie bars 17 extend from one middle block 12 to be connected with two different shoulder blocks 13.

Each pair of the first shoulder tie bars 16 in this embodiment is connected with a respective one of the shoulder blocks 13 and the middle blocks 12 adjacent to the shoulder block 13 on both sides thereof in a tyre circumferential direction. Further, each pair of the second shoulder tie bars 17 in this embodiment is connected with a respective one of the middle blocks 12 and the shoulder blocks 13 adjacent to the middle block 12 on both sides thereof in the tyre circumferential direction. Thereby, each pair of the first shoulder tie bars 16 is formed as a substantially V-shape convex outwardly in the tyre axial direction. Further, each pair of the second shoulder tie bars 17 is formed as a substantially v-shape convex inwardly in the tyre axial direction. The first shoulder tie bars 16 and the second shoulder tie bars 17 configured as such restrain movement of the middle blocks 12 and the shoulder blocks 13 in the tyre axial direction and the tyre circumferential direction, therefore, the effect of suppressing the block chipping is increased.

The first shoulder tie bars 16 and the second shoulder tie bars 17 are arranged alternately in the tyre circumferential direction. That is, in this embodiment, first block groups 18 connected with the first shoulder tie bars 16 and second block groups 19 connected with the second shoulder tie bars 17 are arranged alternately in the tyre circumferential direction. Each of the first block groups 18 is formed by one shoulder block 13 and two middle blocks 12 connected by the first shoulder tie bars 16. Each of the second block groups 19 is formed by one middle block 12 and two shoulder blocks 13 connected by the second shoulder tie bars 17. Thereby, it is possible that the rigidity difference between the shoulder regions (Sh) and the middle regions (Mi) is made small, therefore, stability during cornering on a soft road and a hard road is improved.

Each pair of the first shoulder tie bars 16 is formed by a first portion 16A connected with one of the middle blocks 12 on one side and a second portion 16B connected with one of the middle blocks 12 on the other side. The first portion 16A and the second portion 16B are connected with the shoulder block 13 such that the first portion 16A and the second portion 16B are separated from each other without intersecting with each other. Each pair of the second shoulder tie bars 17 is also formed by a first portion 17A connected with one of the shoulder blocks 13 on one side and a second portion 17B connected with one of the shoulder blocks 13 on the other side. The first portion 17A and the second portion 17B are connected with the middle block 12 such that the first portion 17A and the second portion 17B are separated from each other without intersecting with each other. Thereby, the load from each of the first portions 16A and 17A and the second portions 16B and 17B is distributed to the middle blocks 12 or the shoulder blocks 13, therefore, the block chipping is suppressed.

It is preferred that an angle ($\theta 1$) with respect to the tyre axial direction of each of the shoulder tie bars 15 configured as such is 30 degrees or more and 60 degrees or less. Thereby, deformation, due to running, of the middle blocks 12 and the shoulder blocks 13 which mainly come into contact with the ground during cornering is suppressed, therefore, grip on a hard road during cornering is increased. It is further preferred that the angle ($\theta 1$) of each of the shoulder tie bars 15 is 40 degrees or more and 50 degrees or less. The angle ($\theta 1$) is determined by a width center line of the shoulder tie bar 15 between one middle block 12 and one shoulder block 13 in a plan view of the tread portion 2.

In this embodiment, a pair of the crown tie bars 14 extend from each of the crown blocks 11 to be connected with two different ones of the middle blocks 12. Each pair of the crown tie bars 14 connects a respective one of the crown blocks 11 and two middle blocks 12 adjacent to the crown block 11 on both sides thereof in the tyre circumferential direction. Thereby, each pair of the crown tie bars 14 is formed as a substantially v-shape convex inwardly in the tyre axial direction.

The crown tie bars 14 include first crown tie bars 21 and second crown tie bars 22. In this embodiment, a pair of the crown tie bars 14 extends from each of the crown blocks 11. A pair of the first crown tie bars 21 includes the first crown tie bar 21 extending so as to be connected with one of the middle blocks 12 connected with one of the first shoulder tie bars 16, and the first crown tie bar 21 extending so as to be connected with one of the middle blocks 12 connected with one of the second shoulder tie bars 17 adjacent to the first shoulder tie bar 16 in the tyre circumferential direction. In this embodiment, a pair of the second crown tie bars 22 extends so as to be connected with two middle blocks 12 each connected with a respective one of the first shoulder tie bars 16. The second crown tie bars 22 in this embodiment are arranged on both sides in the tyre circumferential direction of each pair of the first crown tie bars 21 adjacent to each other in the tyre circumferential direction. Note that the arrangement of the first crown tie bars 21 and the second crown tie bars 22 is not limited to such an embodiment.

Each pair of the crown tie bars 14 in this embodiment includes a first crown portion 14A connected with one of the middle blocks 12 on one side and a second crown portion 14B connected with one of the middle blocks 12 on the other side. The first crown portion 14A and the second crown portion 14B in this embodiment are connected with the crown block 11 such that the first crown portion 14A and the second crown portion 14B are separated from each other without intersecting with each other. Note that the crown tie bars 14 are not limited to such an embodiment, but they may be formed only by the first crown portions 14A each connecting one crown block 11 with one middle block 12, for example.

It is preferred that an angle ($\theta 2$) of each of the crown tie bars 14 with respect to the tyre axial direction is larger than the angle ($\theta 1$) of each of the shoulder tie bars 15 with respect to the tyre axial direction. Thereby, the crown tie bars 14 have large tyre circumferential components, therefore, movement in the tyre circumferential direction of the crown blocks 11 to which large ground contact pressure is applied is effectively suppressed, thereby, the grip on a hard road is increased. From such a point of view, it is preferred that the angle ($\theta 2$) of the crown tie bars 14 is 35 degrees or more and 65 degrees or less, for example.

In this embodiment, all the crown blocks 11 and all the middle blocks 12 are connected by the crown tie bar 14, and all the middle blocks 12 and all the shoulder blocks 13 are connected by the shoulder tie bar 15. Note that the present invention is not limited to such an embodiment.

A width (w1) perpendicular to a longitudinal direction of each of the shoulder tie bars 15 is 50% or more of a length (Ws) in the tyre axial direction of each of the shoulder blocks 13. The shoulder tie bars 15 configured as such increase the rigidity of the shoulder blocks and the middle blocks to which relatively large lateral force is applied during cornering. When the width (w1) of each of the shoulder tie bars 15 is excessively large, groove volume of the tread groove 10 is made small, therefore, it is possible that the traction on a muddy road is decreased. Thereby, it is preferred that the width (w1) of each of the shoulder tie bars 15 is less than 90% of the length (Ws).

The width (w1) of each of the shoulder tie bars 15 in this embodiment gradually increases outwardly in the tyre axial direction. Each of the crown tie bars 14 in this embodiment has a width (w2) perpendicular to a longitudinal direction thereof gradually increasing toward a side of the tyre equator (C). The shoulder tie bars 15 increase the rigidity of the shoulder blocks 13 to which large lateral force is applied. The crown tie bars 14 increase the rigidity of the crown blocks 11 to which large ground contact pressure is applied. Each of the crown tie bars 14 and the shoulder tie bars 15 extends linearly, for example.

As shown in FIG. 1, it is preferred that a height (h1) of each of the crown tie bars 14 and a height (h1) of each of the shoulder tie bars 15 in this embodiment is 10% or more and 40% or less of a maximum block height (Hm) of the crown blocks 11, the middle blocks 12, and the shoulder blocks 13. Thereby, the groove volume of the tread groove 10 is secured while the rigidity of each of the blocks 11 to 13 is increased, therefore, the grip on a hard road and the traction on a muddy road are improved.

Figure 3:
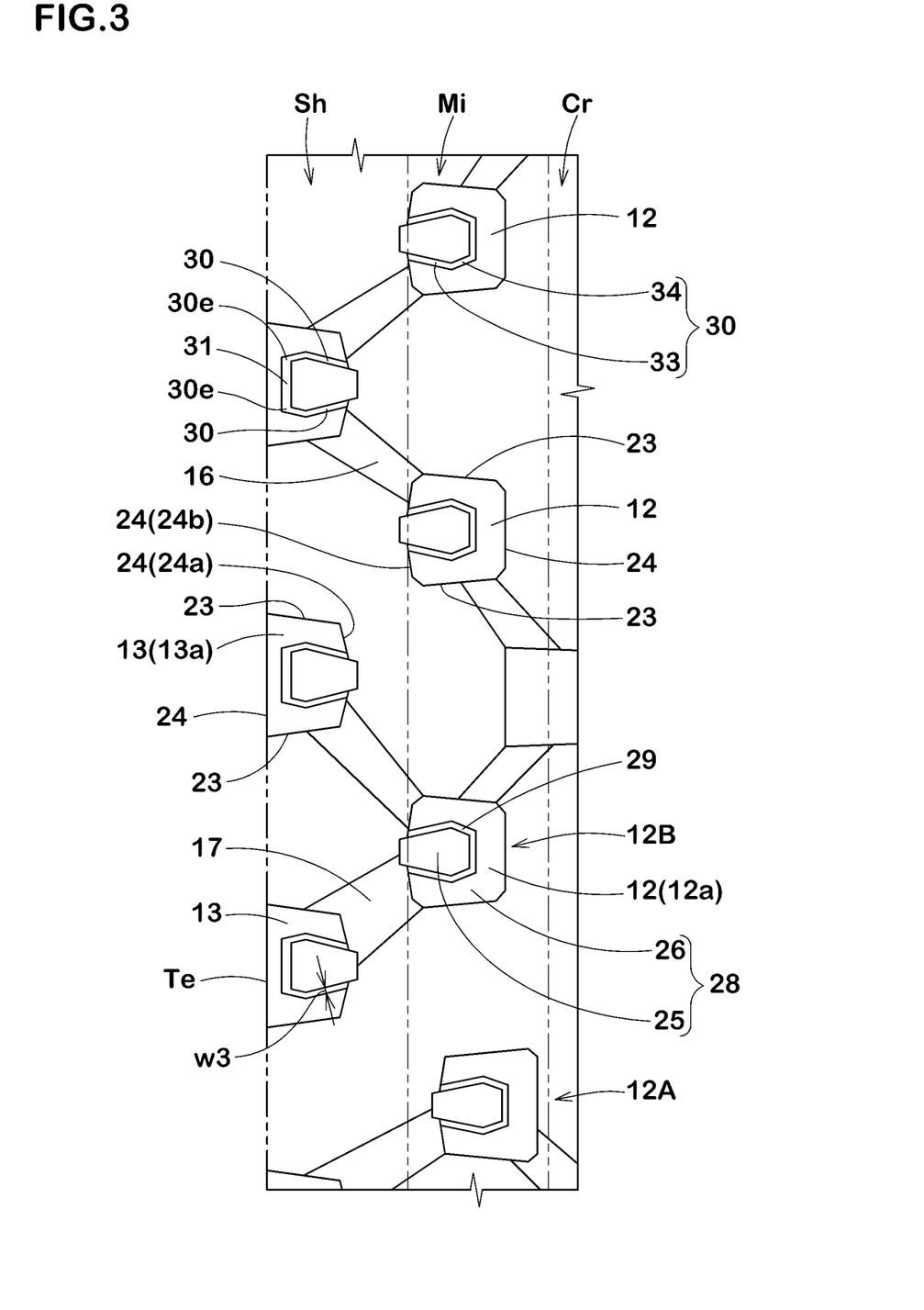
FIG. 3 is an enlarged view of a middle region and a shoulder region of FIG. 2.

FIG. 3 is an enlarged view of one of the middle regions (Mi) and one of the shoulder regions (Sh). As shown in FIG. 3, a ground contacting surface (12a) of each of the middle blocks 12 and a ground contacting surface (13a) of each of the shoulder blocks 13 are each formed in a rectangular shape including a pair of axial edges 23 and a pair of circumferential edges 24 each extending so as to connect between respective ends of the pair of the axial edges 23, for example. The axial edges 23 are arranged on both sides in the tyre circumferential direction of each of the blocks 12 and 13 and extend in the tyre axial direction. The circumferential edges 24 are arranged on both sides in the tyre axial direction of each of the blocks 12 and 13 and extend in the tyre circumferential direction. The axial edges 23 and the circumferential edges 24 configured as such increase scratching force on a road surface during cornering, therefore, the steering stability performance is improved. Note that the ground contacting surfaces (12a) and (13a) of the middle blocks 12 and the shoulder blocks 13 are not limited to such a configuration.

At least one of the middle blocks 12 and the shoulder blocks 13 (each of them in this embodiment) includes a stepped ground contacting surface 28 including a first top surface 25 and a second top surface 26 having a smaller block height than the first top surface 25. The stepped ground contacting surface 28 is formed on all the middle blocks 12 and all the shoulder blocks 13 in this embodiment.

The stepped ground contacting surface 28 in this embodiment is provided with a groove 29 between the first top surface 25 and the second top surface 26. The grooves 29 configured as such increase edge components of the middle blocks 12 and the shoulder blocks 13, therefore, frictional force against a road surface is maintained high.

Each of the grooves 29 in this embodiment includes a pair of axial portions 30 extending in the tyre axial direction and a circumferential portion 31 extending in the tyre circumferential direction so as to connect between the axial portions 30. The axial portions 30 in this embodiment are spaced apart from each other in the tyre circumferential direction.

Each of the pair of the axial portions 30 in this embodiment includes a first inclined portion 33 inclined to one side with respect to the tyre axial direction and a second inclined portion 34 inclined to an opposite side to the first inclined portion 33 with respect to the tyre axial direction. Each of the axial portions 30 in this embodiment is formed by the first inclined portion 33 and the second inclined portion 34 so as to be bent in a convex manner toward outside of a respective one of the blocks 12 and 13.

In each of the blocks 12 and 13, each of the axial portions 30 extends from the circumferential edge 24 on one side toward the circumferential edge 24 on the other side to have a terminating end (30e) terminating within the ground contacting surface without reaching the circumferential edge 24 on the other side. The circumferential portion 31 in this embodiment extends so as to connect between both terminating ends (30e).

The first top surface 25 in this embodiment is formed in a hexagonal shape surrounded by the pair of the axial portions 30 and the circumferential portion 31. The second top surface 26 in this embodiment is formed in a substantially U-shape in a plan view so as to surround the first top surface 25 and the groove 29. In the first top surfaces 25 configured as such, since each of the axial portions 30 is bent, excessive movement and deformation in the tyre axial direction are suppressed, therefore, the block chipping is suppressed.

More specifically, the axial portions 30 of each of the shoulder blocks 13 extend from a circumferential edge (24a) arranged on a side of the tyre equator (C) toward a respective one of the tread edges (Te). The axial portions 30 of each of the middle blocks 12 extend from a circumferential edge (24b) arranged on a side of a respective one of the tread edges (Te) toward a side of the tyre equator (C).

It is preferred that a groove width (w3) of each of the grooves 29 configured as such is about 0.5 mm or more and about 3 mm or less, for example. Further, it is preferred that a depth (h3) (shown in FIG. 1) of each of the grooves 29 is 0.5 mm or more and 5 mm or less.

Figure 4A:
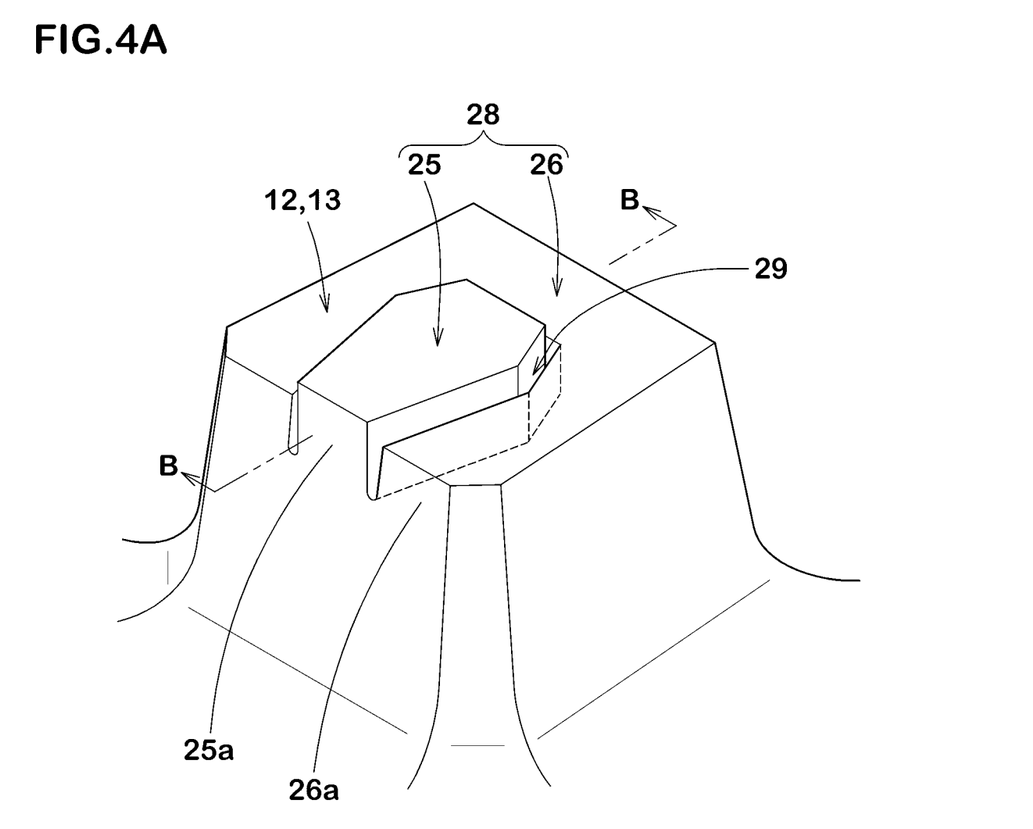
FIG. 4A is a perspective view of one of middle blocks.
Figure 4B:
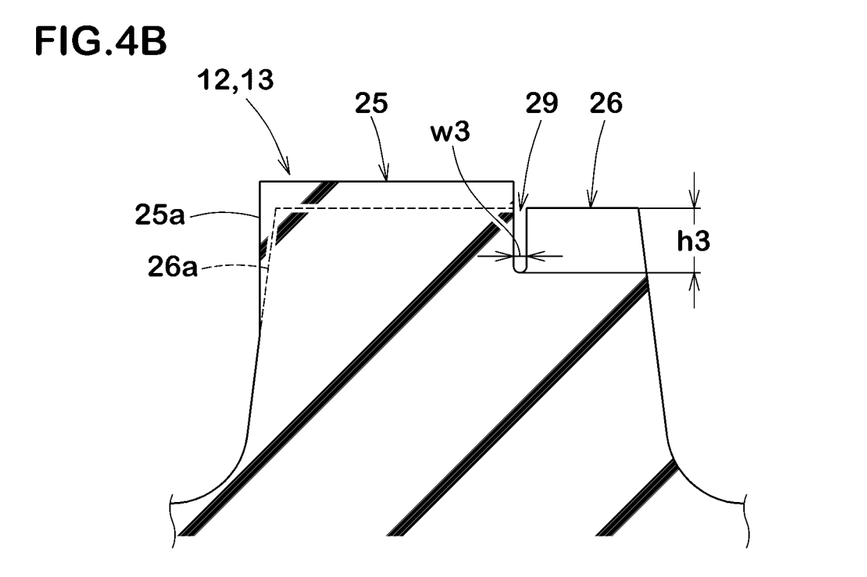
FIG. 4B is a cross-sectional view taken along B-B line of FIG. 4A.

FIG. 4A is a perspective view of one of the middle blocks 12. FIG. 4B is a cross-sectional view taken along B-B line of FIG. 4A. As shown in FIGS. 4A and 4B, each of the middle blocks 12 has a first block wall (25a) extending radially inwardly from the first top surface 25 and a second block wall (26a) extending radially inwardly from the second top surface 26, and the first block wall (25a) is positioned on an outer side of the middle block 12 than the second block wall (26a). The first block walls (25a) and the second block walls (26a) configured as such increase the shearing force with respect to a muddy road. Note that the first block walls (25a) and the second block walls (26a) configured as such may be provided in the shoulder blocks 13.

As shown in FIG. 3, the middle blocks 12 in this embodiment include first middle blocks 12A arranged on the side of the tyre equator (C) and second middle blocks 12B arranged on the side of a respective one of the tread edges (Te) of the first middle blocks 12A. In the middle regions (Mi) in this embodiment, the first middle blocks 12A and the second middle blocks 12B are arranged such that they overlap when viewed in the tyre circumferential direction. Thereby, the behavior of a vehicle body due to a change in leaning of the vehicle body during cornering is stabilized.

Figure 5:
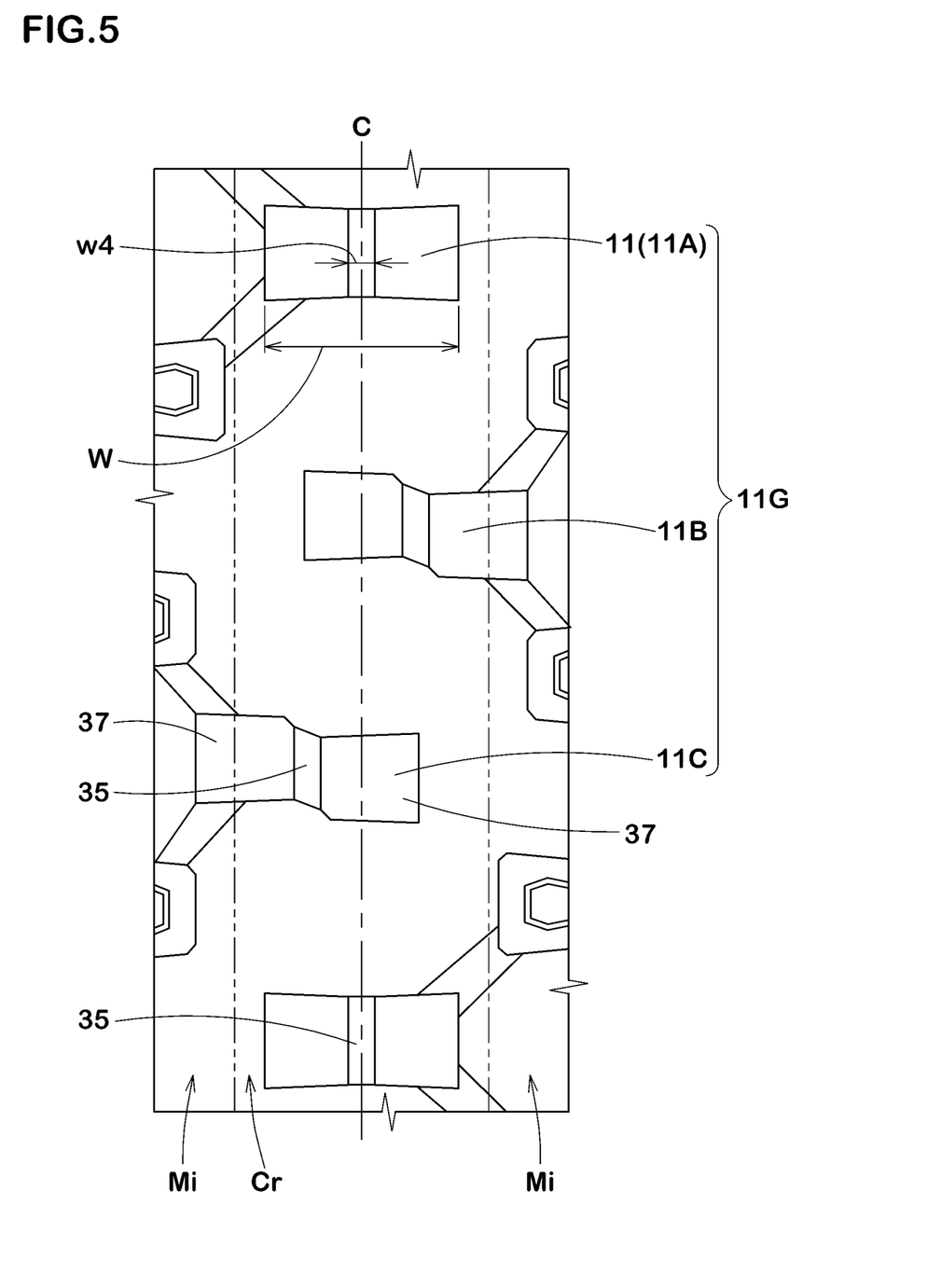
FIG. 5 is an enlarged view of a crown region of FIG. 2.

FIG. 5 is an enlarged view of the crown region (Cr). As shown in FIG. 5, the crown blocks 11 in this embodiment include first crown blocks 11A, second crown blocks 11B, and third crown blocks 11c. The first crown blocks 11A are arranged within the crown region (Cr). Each of the second crown blocks 11B is arranged across the crown region (Cr) and one of the middle regions (Mi) positioned on one side in the tyre axial direction (the right side in the figure). Each of the third crown blocks 11C is arranged across the crown region (Cr) and one of the middle regions (Mi) positioned on the other side in the tyre axial direction (the left side in the figure). Thereby, in the crown region (Cr) in this embodiment, over the entire length in the tyre axial direction, any one of the crown blocks 11A to 11C is arranged on a tyre circumferential direction line. In other words, when viewed in the tyre circumferential direction, at least one of the crown blocks 11A to 11C is arranged on the tyre circumferential direction line at any point in the tyre axial direction over the entire length in the tyre axial direction. Therefore, the behavior of the change in the leaning of the vehicle body from straightaway driving to cornering is stabilized, thereby, the steering stability performance is improved.

In this embodiment, in the crown region (Cr) and the middle regions (Mi), any one of the crown blocks 11A to 11c or any one of the middle blocks 12A and 12B is arranged on a tyre circumferential direction line over the entire length in the tyre axial direction. Thereby, the behavior of the change in the leaning of the vehicle body from straightaway driving to the middle stage of cornering is stabilized, therefore, the steering stability performance is improved.

In this embodiment, one first crown block 11A, one second crown block 11B, and one third crown block 11c form one crown block group 11G, and the crown blocks 11G are arranged in the tyre circumferential direction. Thereby, the effects described above are effectively exerted.

Each of the crown blocks 11 is provided in a center portion thereof with a shallow bottom groove 35, therefore, it is divided into two block pieces 37. The shallow bottom grooves 35 configured as such increase the edge components in the tyre circumferential direction of the crown blocks 11.

stability and the block chipping after the test run was evaluated by the test rider's feeling. The results are indicated by an evaluation point based on the value of Reference 1 being 100, wherein the larger numerical value is better.

Tyre: 80/100-21 (front), 120/80-19 (rear)

Tyre rim: WM1.60 (front), WM2.15 (rear)

Tyre inner pressure: 80 kPa

Test vehicle: motorcycle for motocross competition with a displacement of 450 cc.

The test results and the like are shown in Table 1.

TABLE 1

|  | Ref. 1 | Ref. 2 | Ref. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Presence (P) or Absence (A) of Shoulder tie bar | A | P | P | P | P | P | P | P | P | P | P |
| Land ratio (Ls)/Land ratio (Lc) [%] | 108 | 120 | 80 | 108 | 90 | 115 | 108 | 108 | 108 | 108 | 108 |
| Presence (P) or Absence (A) of First shoulder tie bar | A | P | P | P | P | P | P | P | P | P | P |
| Angle (θ1) of Shoulder tie bar [degree] | — | 45 | 45 | 45 | 45 | 45 | 30 | 60 | 45 | 45 | 45 |
| Height (h1) of Shoulder tie bar/ Maximum block height (Hm) [%] | — | 22 | 22 | 22 | 22 | 22 | 22 | 22 | 10 | 40 | 22 |
| Presence (P) or Absence (A) of Stepped ground contacting surface | — | P | P | P | P | P | P | P | P | P | A |
| Steering stability performance on Soft road [evaluation point: larger numerical value is better] | 100 | 105 | 95 | 110 | 105 | 108 | 108 | 105 | 107 | 108 | 107 |
| Steering stability performance on Hard road [evaluation point: larger numerical value is better] | 100 | 95 | 105 | 110 | 108 | 105 | 105 | 108 | 107 | 108 | 107 |
| Block chipping [evaluation point: larger numerical value is better] | 100 | 105 | 105 | 115 | 110 | 110 | 110 | 110 | 105 | 115 | 115 |

It is preferred that a width (w4) of each of the shallow bottom grooves 35 is 5% or more and 25% or less of a width (W) of each of the crown blocks 11, and it is preferred that a depth (h4) (shown in FIG. 1) of each of the shallow bottom grooves 35 is 5% or more and 50% or less of the block height (H1) of each of the crown blocks 11, for example.

Each of the first crown blocks 11A is formed as a non-shift block in which two block pieces 37 are not displaced in the tyre circumferential direction. Each of the second crown blocks 11B and the third crown blocks 11C is formed as a shift block in which two block pieces 37 are displaced in the tyre circumferential direction.

While detailed description has been made of the tyre as an embodiment of the present invention, it is needless to say that the present invention can be embodied in various forms without being limited to the illustrated embodiment.

Working Examples (Examples)

Pneumatic tyres for a motorcycle having the basic structure shown in FIG. 1 and the basic pattern shown in FIG. 2 were made by way of test according to the specifications listed in Table 1, then each of the test tyres was tested for the steering stability performance on a soft road and a hard road and the block chipping. Common specifications of the test tyres and the test methods were as follows.
<Steering Stability Performance on Soft Road and Hard Road and Block Chipping>

Each of the test tyres were mounted on a test vehicle described below and a test rider drove the test vehicle on a dry asphalt road surface and a muddy road surface of a test course. While the test rider drove the test vehicle, the steering stability performance related to the grip and the From the test results, it was confirmed that the tyres in the Examples in Table 1 exerted high steering stability performance and the block chipping was suppressed compared with the tyres in the References in Table 1.

The invention claimed is:

1. A tyre for running on rough terrain comprising:
a tread portion, wherein
the tread portion includes a crown region, middle regions, and shoulder regions,
the crown region has a center portion thereof positioned on a tyre equator and a development width of one third of a tread development width,
the middle regions are arranged on both outer sides in a tyre axial direction of the crown region and each have a development width of one sixth of the tread development width,
the shoulder regions are arranged on both outer sides in the tyre axial direction of the middle regions and each have a development width of one sixth of the tread development width,
the crown region is provided with a plurality of crown blocks,
each of the middle regions is provided with a plurality of middle blocks,
each of the shoulder regions is provided with a plurality of shoulder blocks,
each of the middle blocks is connected with at least one of the crown blocks by a crown tie bar and connected with at least one of the shoulder blocks by a shoulder tie bar,
a land ratio of the shoulder regions is 90% or more and 115% or less of a land ratio of the crown region, the shoulder tie bars include first shoulder tie bars and the second shoulder tie bars, a pair of the first shoulder tie bars extend from one shoulder block to be connected with two different middle blocks, a pair of the second shoulder tie bars extend from one middle block to be connected with two different shoulder blocks, the tread portion includes first block groups and second block groups arranged alternately directly in a tyre circumferential direction, each of the first block groups is formed by one shoulder block connected with two middle blocks by two first shoulder tie bars, each of the second block groups is formed by one middle block connected with two shoulder blocks by two second shoulder tie bars, the two middle blocks in each first block group are not connected with the shoulder blocks in the second block groups via tie bars, at least one of the middle blocks and the shoulder blocks includes a stepped ground contacting surface including a first top surface and a second top surface having a smaller block height than the first top surface, a groove is provided between the first top surface and the second top surface, the groove includes a pair of axial portions extending in the tyre axial direction, each of the pair of the axial portions includes a first inclined portion inclined to one side with respect to the tyre axial direction and a second inclined portion inclined to a side opposite to the first inclined portion with respect to the tyre axial direction, one of the pair of axial portions is bent to protrude a first direction in the tyre circumferential direction, and the other one of the pair of axial portions is bent to protrude a second direction in the tyre circumferential direction which is opposite direction to the first direction.

2. The tyre for running on rough terrain according to claim 1, wherein a height of each of the shoulder tie bars and the crown tie bars is 10% or more and 40% or less of a maximum block height of the crown blocks, the middle blocks, and the shoulder blocks.

3. The tyre for running on rough terrain according to claim 1, wherein a width perpendicular to a longitudinal direction of each of the shoulder tie bars is 50% or more of a length in the tyre axial direction of each of the shoulder blocks.

4. The tyre for running on rough terrain according to claim 1, wherein a land ratio of the middle regions is 95% or more and 105% or less of the land ratio of the crown region.

5. The tyre for running on rough terrain according to claim 1, wherein one shoulder block and a pair of the first shoulder tie bars extending therefrom form a substantially V-shape convex outwardly in the tyre axial direction, and one middle block and a pair of the second shoulder tie bars extending therefrom form a substantially V-shape convex inwardly in the tyre axial direction.

6. The tyre for running on rough terrain according to claim 1, wherein the pair of the first shoulder tie bars is formed by a first portion connected with one of the two middle blocks on one side and a second portion connected with one of the two middle blocks on the other side, the first portion and the second portion of the first shoulder tie bars are connected with the shoulder block such that the first portion and the second portion are separated without intersecting with each other, the pair of the second shoulder tie bars is formed by a first portion connected with one of the two shoulder blocks on one side and a second portion connected with one of the two shoulder blocks on the other side, and the first portion and the second portion of the second shoulder tie bars are connected with the middle block such that the first portion and the second portion are separated without intersecting with each other.

7. The tyre for running on rough terrain according to claim 1, wherein an angle with respect to the tyre axial direction of each of the shoulder tie bars is 30 degrees or more and 60 degrees or less.

8. The tyre for running on rough terrain according to claim 1, wherein each of the crown blocks is connected with two middle blocks by a pair of the crown tie bars, and the pair of the crown tie bars is formed as a substantially V-shape convex inwardly in the tyre axial direction.

9. The tyre for running on rough terrain according to claim 8, wherein the pair of the crown tie bars include a first crown portion connected with one of the middle blocks on one side and a second crown portion connected with one of the middle blocks on the other side, and the first crown portion and the second crown portion are connected with the crown block such that the first crown portion and the second crown portion are separated without intersecting with each other.

10. The tyre for running on rough terrain according to claim 1, wherein an angle of each of the crown tie bars with respect to the tyre axial direction is larger than an angle of each of the shoulder tie bars with respect to the tyre axial direction.

11. The tyre for running on rough terrain according to claim 1, wherein the crown blocks include first crown blocks, second crown blocks, and third crown blocks, the first crown blocks are arranged within the crown region, each of the second crown blocks is arranged across the crown region and the middle region on one side in the tyre axial direction, and each of the third crown blocks is arranged across the crown region and the middle region on the other side in the tyre axial direction.

12. A tyre for running on rough terrain comprising:

a tread portion, wherein the tread portion includes a crown region, middle regions, and shoulder regions, the crown region has a center portion thereof positioned on a tyre equator and a development width of one third of a tread development width, the middle regions are arranged on both outer sides in a tyre axial direction of the crown region and each have a development width of one sixth of the tread development width, the shoulder regions are arranged on both outer sides in the tyre axial direction of the middle regions and each have a development width of one sixth of the tread development width, the crown region is provided with a plurality of crown blocks, each of the middle regions is provided with a plurality of middle blocks, each of the shoulder regions is provided with a plurality of shoulder blocks, each of the middle blocks is connected with at least one of the crown blocks by a crown tie bar and connected with at least one of the shoulder blocks by a shoulder tie bar, a land ratio of the shoulder regions is 90% or more and 115% or less of a land ratio of the crown region, the shoulder tie bars include first shoulder tie bars and the second shoulder tie bars, a pair of the first shoulder tie bars extend from one shoulder block to be connected with two different middle blocks, a pair of the second shoulder tie bars extend from one middle block to be connected with two different shoulder blocks, the tread portion includes first block groups and second block groups arranged alternately directly in a tyre circumferential direction, each of the first block groups is formed by one shoulder block connected with two middle blocks by two first shoulder tie bars, each of the second block groups is formed by one middle block connected with two shoulder blocks by two second shoulder tie bars, the two middle blocks in each first block group are not connected with the shoulder blocks in the second block groups via tie bars, at least one of the middle blocks and the shoulder blocks includes a stepped ground contacting surface including a first top surface and a second top surface having a smaller block height than the first top surface, a groove is provided between the first top surface and the second top surface, the groove includes a pair of axial portions extending in the tyre axial direction, the groove includes a circumferential portion, each of the axial portions extends from a circumferential edge of the stepped ground contacting surface on one side toward a circumferential edge of the stepped ground contacting surface on the other side to have a terminating end terminating within the stepped ground contacting surface without reaching the circumferential edge on the other side, and the circumferential portion extends so as to connect between both terminating ends.

13. The tyre for running on rough terrain according to claim 12, wherein the middle blocks and the shoulder blocks include the stepped ground contacting surfaces, the axial portions of the shoulder blocks extend axially outwardly from the circumferential edges arranged on an inner side in the tyre axial direction, and the axial portions of the middle blocks extend axially inwardly from the circumferential edges arranged on an outer side in the tyre axial direction.

14. A tyre for running on rough terrain comprising:
a tread portion, wherein the tread portion includes a crown region, middle regions, and shoulder regions, the crown region has a center portion thereof positioned on a tyre equator and a development width of one third of a tread development width, the middle regions are arranged on both outer sides in a tyre axial direction of the crown region and each have a development width of one sixth of the tread development width, the shoulder regions are arranged on both outer sides in the tyre axial direction of the middle regions and each have a development width of one sixth of the tread development width, the crown region is provided with a plurality of crown blocks, each of the middle regions is provided with a plurality of middle blocks, each of the shoulder regions is provided with a plurality of shoulder blocks, each of the middle blocks is connected with at least one of the crown blocks by a crown tie bar and connected with at least one of the shoulder blocks by a shoulder tie bar, a land ratio of the shoulder regions is 90% or more and 115% or less of a land ratio of the crown region, the shoulder tie bars include first shoulder tie bars and the second shoulder tie bars, a pair of the first shoulder tie bars extend from one shoulder block to be connected with two different middle blocks, a pair of the second shoulder tie bars extend from one middle block to be connected with two different shoulder blocks, the tread portion includes first block groups and second block groups arranged alternately directly in a tyre circumferential direction, each of the first block groups is formed by one shoulder block connected with two middle blocks by two first shoulder tie bars, each of the second block groups is formed by one middle block connected with two shoulder blocks by two second shoulder tie bars, the two middle blocks in each first block group are not connected with the shoulder blocks in the second block groups via tie bars, at least one of the middle blocks and the shoulder blocks includes a stepped ground contacting surface including a first top surface and a second top surface having a smaller block height than the first top surface, the at least one of the middle blocks and the shoulder blocks has a first block wall extending inwardly in a tyre radial direction from the first top surface and a second block wall extending inwardly in the tyre radial direction from the second top surface, and the first block wall is positioned on an outer side of the block than the second block wall.

* * * * *